United States Patent [19]
Ellis

[11] 3,802,720
[45] Apr. 9, 1974

[54] OUTRIGGER ROLL BAR APPARATUS FOR TRACTOR VEHICLES

[75] Inventor: Jacob B. Ellis, Okmulgee, Okla.

[73] Assignee: Roy T. Brown, Jr., Bixby, Okla.

[22] Filed: Mar. 15, 1973

[21] Appl. No.: 341,228

[52] U.S. Cl. .............................. 280/150 C, 296/102
[51] Int. Cl. ............................................ B62r 25/06
[58] Field of Search ................. 280/150 C; 296/102

[56] References Cited
UNITED STATES PATENTS
2,750,204  6/1956  Ohrmann ....................... 280/150 C
2,767,995  10/1956  Stout ............................. 280/150 C
2,973,209  2/1961  Shaki ............................ 280/150 C
3,004,770  10/1961  Bettenhausen ................. 280/150 C
3,397,898  8/1968  Denney et al. ................. 280/150 C
3,402,941  9/1968  Martinmaas .................... 280/150 C FOREIGN PATENTS OR APPLICATIONS
1,292,231  3/1962  France ........................... 280/150 C Primary Examiner—Leo Friaglia

[57] ABSTRACT

An outrigger and roll bar apparatus for use on tractor vehicles and the like and comprising outrigger means pivotally secured to the vehicle, extension means connected between the vehicle and the outrigger means for pivotally extending or retracting the said outrigger means, roll bar means operably connected to the outrigger means whereby upon retraction of the said outrigger means, the said roll bar means forms a roll bar over the vehicle.

8 Claims, 4 Drawing Figures

OUTRIGGER ROLL BAR APPARATUS FOR TRACTOR VEHICLES

BACKGROUND OF THE INVENTION

1. Field of the Invention

This invention relates to highway and field safety apparatus for tractor vehicles and the like, and more particularly, but not by way of limitation, to an outrigger and roll bar apparatus for use on tractor vehicles, farm vehicles and the like having extendable outrigger means to prevent overturning while the vehicle is in use and roll bar means for protection of the vehicle operator when the outrigger means is not in use.

2. Description of the Prior Art

Field use of tractor vehicles or farm vehicles has always been plagued with the problem of such vehicles overturning while in use. Such vehicles are often called into use for working around the side of hills and steep embankments and the like, whereby tractor vehicles or the like, having high centers of gravity are likely to overturn causing equipment damage and often injury to the operator thereof. Several attempts have been made to overcome the inherent safety problems associated with operating such vehicles on steep terrain such as the stabilizer device disclosed in the patent to Denney et al, Ser. No. 3,397,898, issued Aug. 20, 1968 and entitled "Stabilizer for Motor Vehicle." However, such devices when retracted or not in use are simply added weight and added machinery to get in the way of the vehicle driver.

Recent highway regulations in several states have been changed to require farm tractors and similar vehicles to be provided will roll bars for protection of the driver when said vehicle is moving along highways. In tractor vehicles of the large rear wheel type, there is also the added danger of the vehicle tipping over backwards which inevitably puts the driver in extreme danger since he is normally positioned near the rear of the vehicle for the operation thereof. Several attempts have been made to overcome this hazard by means of adjustable roll bars such as disclosed in the patent to Martinmaas, Ser. No. 3,402,941, issued Sept. 24, 1968 and entitled "Adjustable Roll Bar for Tractors" where a heavy duty adjustable roll bar is secured to the rear end of the tractor, the said roll bar being mounted upon telescoping forwardly extending beams whereby the roll bar apparatus may be moved rearwardly to protect the driver in case of a rearward tip over of the vehicle itself. However, this solution has a built in disadvantage in that when you move the roll bar apparatus rearwardly, you are in effect moving the center of the gravity of the vehicle itself rearwardly thereby increasing the chances of the said vehicle tipping over backwards.

It is also noted that both the roll bar solution and the outrigger solutions heretofore provided teach the mounting of such apparatuses to the rear of a tractor vehicle. Such mounting, in addition to causing instability of the vehicle itself due to the added weight at the rear end thereof, also have the disadvantage of interferring with the connection of farm equipment such as mowers, plows, trailers, etc., which are normally connected to the rear end of such vehicles. Hence, the introduction of auxiliary equipment on the rear end of the tractor greatly interferes with the very function of the tractor vehicle itself.

SUMMARY OF THE INVENTION

The present invention contemplates a novel outrigger and roll bar apparatus which is particularly designed and constructed for overcoming the above disadvantages. The present invention is provided with telescopic outrigger arms which are pivotally secured to existing frame brackets provided on the tractor vehicle between the front and back wheels thereof. These outrigger members are pivotally secured to said frame whereby they may be retracted into an upright position on each side of the tractor body thereby tending to hold the center of gravity of the entire vehicle between the wheels thereof for greater stability. These outrigger members are also provided with traversely extending bar members which meet overhead of the driver of the vehicle when the outrigger members are in a retracted upright position. The said bars are then interconnected at their abutting ends for providing a roll bar for the vehicle when the outriggers are not being used. The outriggers are also provided with a rearwardly extending support bar for preventing injury to the driver in case the vehicle tipped over in a rearward direction while the outrigger members are in a retracted position.

DETAILED DESCRIPTION OF THE DRAWINGS

Other and further advantageous features of the present invention will hereinafter more fully appear in connection with a detailed description of the drawings in which.

DETAILED DESCRIPTION OF THE INVENTION

Figure 1:
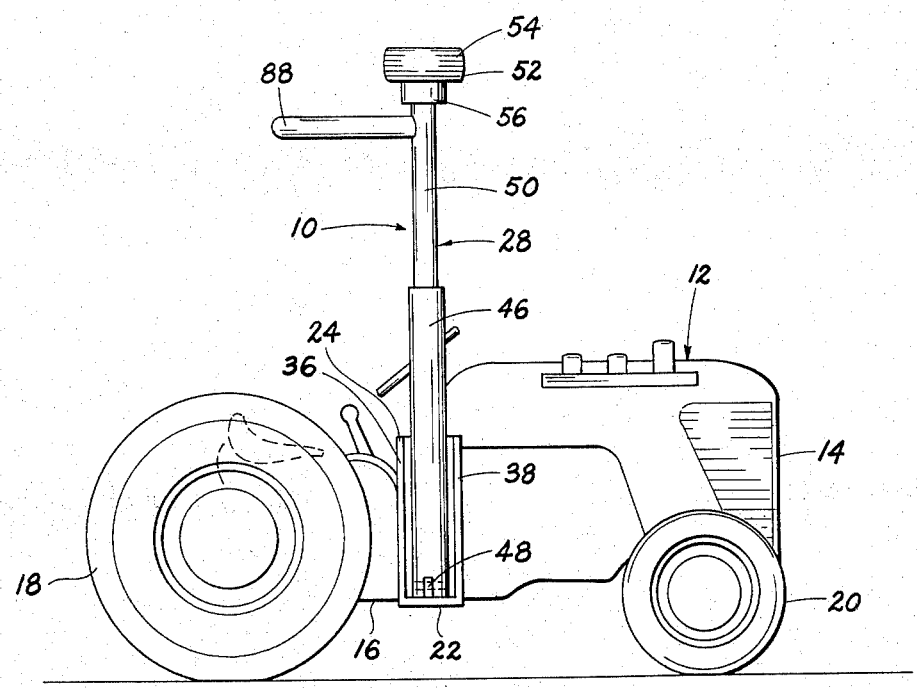
FIG. 1 is an elevational profile view of a tractor vehicle equipped with an outrigger and roll bar apparatus embodying the present invention.

Referring to the drawings in detail, reference character 10 generally indicates a roll bar and outrigger apparatus which is secured to and for use with a farm vehicle or the like, said vehicle being generally indicated by reference character 12. The typical farm vehicle 12 is normally provided with a body 14 which is mounted on a frame 16, said frame 16 being connected between a large pair of spaced rear wheels 18 and a smaller pair of spaced front wheels 20. Normally such vehicles are provided with outwardly extending bracket means 22 which are secured to the frame 16 and are provided for mounting accessory equipment thereon.

The outrigger and roll bar apparatus 10 generally comprises a pair of oppositely disposed upright support members 24 and 26 which are secured at the base thereof to the bracket member 22. A pair of telescoping outrigger means generally indicated by reference characters 28 and 30 are pivotally secured to the support members 24 and 26, respectively, near the base thereof. Roll bar means generally indicated by reference character 32 are provided on the outrigger means 28 and 30 in a manner that will be hereinafter set forth.

The support member 24 comprises an elongated vertically disposed channel member having the open side thereof facing outwardly from the vehicle 12. The channel member 24 has an elongated vertically disposed back plate 34 and a pair of outwardly extending side plates 36 and 38 which are secured along each side of the back plate 34. The bottom ends of the back plate 34 and the two side plates 36 and 38 are rigidly secured to one side of the outwardly extending bracket member 22 of the vehicle 14.

The support member 26 is substantially identical to the support member 24 and consists of an elongated channel member having a back plate 40 and a pair of oppositely disposed outwardly extending side plates 42 and 44 secured along each edge of the back plate 40. The bottom ends of the back plate 40 and outwardly extending side plates 42 and 44 are rigidly secured to the opposite side of the outwardly extending bracket member 22 of the vehicle 14.

The outrigger means 28 comprises an elongated sleeve member 46 which is pivotally secured to the outer edge of the bracket member 22 by means of a longitudinally disposed pin member 48 adjacent to the lower outer edge of the channel member 24. It is noted that the sleeve member 46 may be attached to either the bracket 22 or the outer lower edges of the channel member 24. An extendable outrigger arm member 50 is reciprocally disposed within the sleeve member 46, the outer end thereof being provided with a wheel assembly generally indicated by reference character 52, the said wheel assembly being mounted to rotate on an axis which is concentric with the axis of the extendable arm member 50. The extendable arm member 50 may be held in position at any desired extended length in any well known manner such as by retainer pins (not shown). It is also noted that the entire sleeve member 46 with the extension arm 50 may consist of a hydraulic cylinder having a fluid operated piston inside the said cylinder 46.

The outrigger wheel assembly 52 comprises a wheel with associated tire 54 which is rotatably secured to the outer end of the bar member 50, its axis of rotation being concentric with the axis of the bar 50. An individual wheel motor 56 may be secured to the arm member 50 and operably connected to the wheel 54 for either constantly driving the said wheel 54 or intermittently driving the said wheel when the said wheel encounters a hole or an obstacle where drive means is needed for moving the said wheel thereacross.

A hydraulic or fluid operated cylinder 58 is pivotally secured to the back plate 34 by means of a longitudinally disposed pin member 60 said cylinder 58 being disposed between the side plates 36 and 38 of the channel member 34. It is also noted that the cylinder 58 may be pivotally secured to the said side plates 36 and 38 at a point adjacent to the back plate 34. The pivotal connection 60 of the cylinder 58 is spaced above the bracket member 22 of the vehicle 14 for a purpose that will be hereinafter set forth. An outwardly extending connector rod 62 is reciprocally disposed within the cylinder 58, the outer end thereof being pivotally connected to the sleeve member 46 near the outer end thereof by means of a longitudinally disposed pin member 64. The fluid operated cylinder 58 may be controlled from the vehicle by means of a hydraulic control panel (not shown).

From the foregoing it is apparent that the outrigger means 28 may be extended or retracted in length by means of the sleeve member 46 and outwardly extending reciprocating arm member 50 and may be positioned at any desired angle from vertical to substantially horizontal by means of the fluid operated cylinder 58 with associated outwardly extending reciprocating arm member 62.

The oppositely disposed outrigger means 30 is substantially identical to the outrigger means 28 and comprises a sleeve member 66 which is pivotally secured to the outer edge of the opposite side of the bracket member 22 adjacent to the lower outer corner of the channel member 26 by means of a longitudinally disposed pin 68. A telescoping elongated arm member 70 is reciprocally disposed within the sleeve member 66, the outer end thereof being provided with a wheel member 72 rotatably secured thereto, the axis of rotation of the wheel member 72 being concentric with the axis of the arm member 70. An individual drive motor 74 may be secured to the arm member 70 and operably connected to the wheel 72 for independently driving the wheel 72 either intermittently or constantly while the outrigger means 30 is in operation. The extendable arm member 70 may be extended either mechanically or may simply consist of a hydraulically operated arm disposed within a hydraulic cylinder such as the sleeve member 66.

A hydraulic cylinder 76 is pivotally secured at one end thereof to the channel member 30 adjacent to the back plate 40 thereof and spaced vertically from the outwardly extending bracket member 22 of the vehicle 14 by means of a longitudinally disposed pin member 78. An elongated connector rod 80 is reciprocally disposed within the cylinder 76, the outer end of the rod 80 being pivotally secured to the sleeve member 66 near the outer end thereof. The extension or retraction of the connector rod 80 may be accomplished by hydraulic controls (not shown) located on the vehicle near the operator's position.

It is readily apparent from the foregoing that the outrigger arm 30 is substantially identical to the outrigger arm 28 and may be extended in length by means of the extendable bar 70. Also, the outrigger arm 30 may be independently positioned at any desired angle ranging from vertical to substantially horizontal or slightly below the horizontal depending on the extension capabilities of the fluid operated cylinder 76 with associated connector 80.

The roll bar means 32 comprises a first outwardly extending bar member 84 having one end thereof rigidly secured to the extendable bar member 50 of the outrigger means 28, the said bar 84 lying in a transverse plane formed by the outrigger means 28 and the support means 24. The said roll bar segment 84 extends upwardly when the outrigger means 28 is pivoted to a horizontal position. The outer end of the roll bar segment 84 is provided with a connection means 86 for a purpose that will be hereinafter set forth. A rearwardly extending bar member 88 is secured either to the base of the roll bar segment 84 or to the outer portion of the extendable outrigger arm member 50 adjacent to the base of the roll bar segment 84, said rearwardly extending bar member 88 being provided for a purpose that will be hereinafter set forth.

The roll bar means 32 also comprises an oppositely disposed outwardly extending roll segment 90 which is secured to the extendable outrigger arm 70 near the outer end thereof said roll bar segment 90 extending upwardly when the outrigger means 30 is pivoted to a substantially horizontal position said roll bar segment 90 also lying in a transverse plane formed by the outrigger means 30 and the channel means 26. A connection means 92 is secured to the outer end of the roll bar segment 90 for a purpose that will be hereinafter set forth. A second rearwardly extending bar member 94 is secured to the base of the roll bar segment 90 or to the extendable outrigger arm 70 adjacent to the base of the roll segment 90 for a purpose that will be hereinafter set forth.

Figure 2:
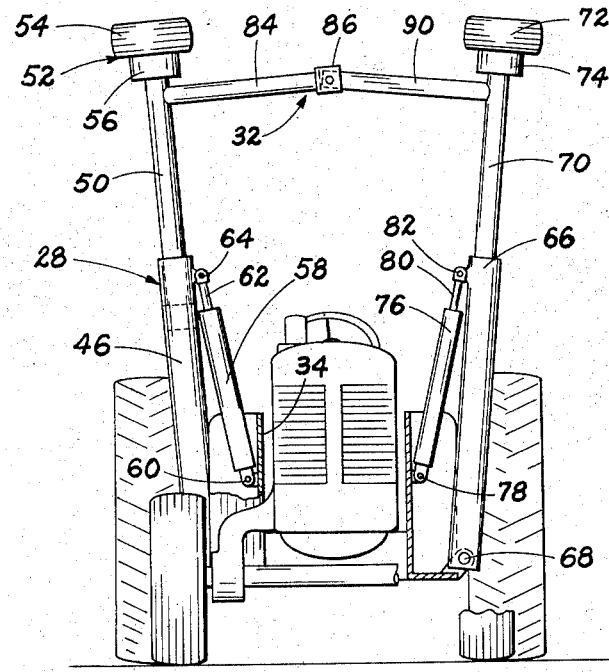
FIG. 2 is a front elevational view of the apparatus of FIG. 1.

It is readily apparent that when the outrigger arm means 28 and 30 are retracted to their upright position as shown in FIGS. 1 and 2 the roll bar segments 84 and 90 meet to form a horizontally extending roll bar means 32. The connection means 92 of the roll bar segment 90 fits and locks into the connection means 86 of the roll bar segment 84 by any well known means which forms a rigid roll bar structure made up of the upwardly extending outrigger means 28 and 30 and the cross bar formed by the roll bar segments 84 and 90. Also, the rearwardly extending bar members 88 and 94 will provide additional protection for the driver of the vehicle 12 in that if the vehicle 12 should tip over rearwardly while the roll bar segments are connected, the rearwardly extending ends of the bars 88 and 90 would strike the terrain thereby providing support for the vehicle 12 to prevent the said vehicle 12 from falling onto the operator thereof.

Figure 3:
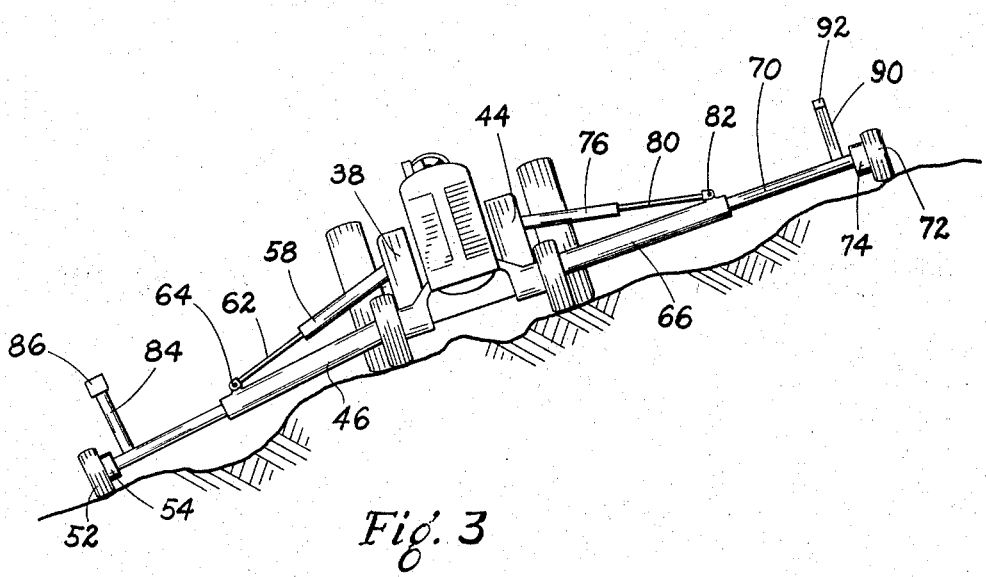
FIG. 3 is a front elevational view of the vehicle of FIG. 1 being operated in uneven terrain with outrigger arms extended.
Figure 4:
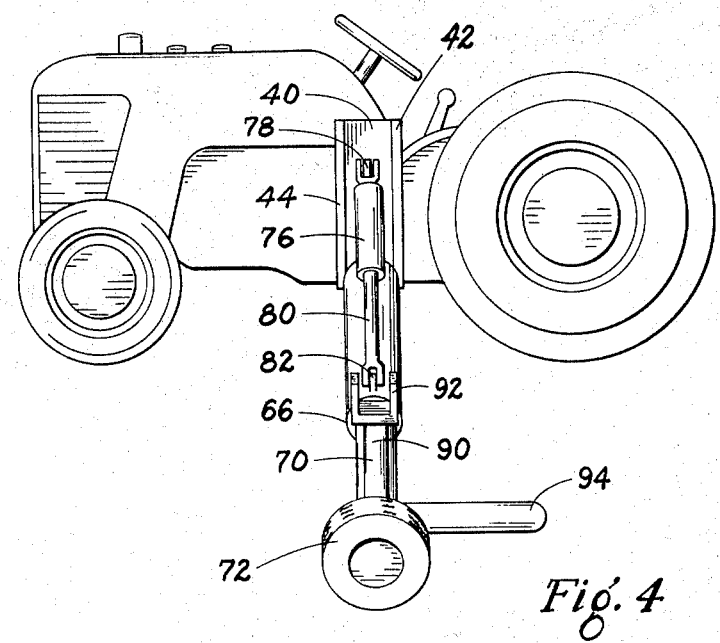
FIG. 4 is a side elevational view of the tractor vehicle as depicted in FIG. 3.

It is also noted that when the vehicle 12 is being operated on uneven terrain as depicted in FIG. 3, the outrigger means 28 will serve to prevent the vehicle 12 from tipping over in a counterclockwise direction as shown in FIG. 3. However, it is also helpful to extend the opposite outrigger means 30 to its foremost position to provide a counter balance for the vehicle 12 which also tends to prevent the vehicle from tipping over. It is readily apparent that the outrigger arms 28 and 30 may be rotated or extended to substantially any desirable angle to provide counter balance for the tractor vehicle 12.

From the foregoing, it will be apparent that the present invention provides an outrigger and roll bar apparatus which is particularly designed and constructed for greatly enhancing the safety of a tractor vehicle while in use in the field or on the highway. The novel outrigger and roll bar assembly is economical and durable in construction and simple and efficient in operation.

Whereas the present invention has been described in particular relation to the drawings attached hereto, it should be understood that other and further modifications, apart from those shown or suggested herein, may be made within the spirit and scope of this invention.

What is claimed is:

1. An outrigger and roll bar apparatus for use on tractor vehicles and the like and comprising elongated outrigger means pivotally secured to the vehicle, extension means connected between the vehicle and outrigger means for pivotally extending or retracting the said outrigger means, roll bar means operably connected to the outrigger means whereby upon retraction of the said outrigger means the roll bar means forms a roll bar over the vehicle.

2. An outrigger and roll bar apparatus as set forth in claim 1 wherein the outrigger means comprises a pair of oppositely disposed elongated outrigger arm members, each of said arm members being provided with wheel means at the outer end thereof.

3. An outrigger and roll bar apparatus as set forth in claim 2 wherein each of the elongated outrigger arm members comprises a sleeve member pivotally secured at one end thereof to the vehicle, elongated telescoping arm member reciprocally disposed within the sleeve member whereby said telescoping arm member may be extended or retracted independently.

4. An outrigger and roll bar apparatus as set forth in claim 1 wherein the extension means comprises a pair of oppositely disposed fluid operated cylinders each said fluid operating cylinder being pivotally connected between the vehicle and the outrigger means whereby upon extension of the fluid operated cylinder, the outrigger means is pivotally rotated outwardly from the vehicle and upon retraction of the fluid cylinder means, the outrigger means are rotated to a substantially vertical position.

5. An outrigger and roll bar apparatus as set forth in claim 2 wherein the roll bar means comprises a pair of oppositely disposed elongated bar segments, one connected to each outrigger arm member adjacent to the outer end thereof, roll bar connector means secured to the outer ends of the said bar segments whereby upon retracting the said outrigger arms, the roll bar segments are connected together by the connector means thereby forming a roll bar across the vehicle.

6. An outrigger and roll bar apparatus as set forth in claim 5 wherein the roll bar means also comprises a pair of rearwardly extending bar members, one said bar member being connected to each outrigger arm member whereby upon retraction of the said outrigger arm members the said rearwardly extending bar members provide additional protection in case the vehicle tips over backwardly.

7. An outrigger and roll bar apparatus for use on tractor vehicles and the like and comprising a pair of oppositely disposed telescoping outrigger arm members, one said arm member being pivotally secured at one end thereof to the base of the vehicle on one side thereof the other said arm member being pivotally secured at one end thereof to the base of the vehicle on the opposite side thereof, a first fluid operated extendable cylinder having one end thereof pivotally connected to the vehicle, the opposite end thereof being pivotally connected to one of the outrigger arm members, a second fluid operated extendable cylinder having one end thereof pivotally connected to the vehicle, the opposite end thereof being pivotally connected to the other outrigger arm member whereby upon extension of the said fluid operated cylinders the outrigger arm members may be pivoted outwardly away from the vehicle and upon retraction of the said fluid operated cylinders, the outrigger arm members may be pivotally rotated toward a substantially vertical position, roll bar means comprising a first roll bar segment being rigidly secured to the outer end of one of the outrigger arm members, a second roll bar segment being rigidly secured to the outer end of the other outrigger arm member, the said roll bar segments being positioned so that when the outrigger arm members are retracted to substantially a vertical position, the said roll bar segments will intersect at the outer ends thereof to form a roll bar over the vehicle, and locking means provided on the said roll bar segments for locking the said roll bar segments into position when the outrigger arm members are fully retracted.

8. An outrigger and roll bar apparatus as set forth in claim 7 wherein the roll bar means also comprises a first rearwardly extending bar member secured to the outer end of one end of the outrigger arm members adjacent to the first roll bar segment, and a second rearwardly extending bar member rigidly connected to the outer end of the other outrigger arm member adjacent to the second roll bar segment whereby upon retraction of the outrigger arm members the said rearwardly extending bar members form additional safety protection in case the vehicle tips over in a rearward direction.

* * * * *

UNITED STATES PATENT OFFICE
CERTIFICATE OF CORRECTION

Patent No. 3,802,720            Dated April 9, 1974

Inventor(s) Jacob B. Ellis

It is certified that error appears in the above-identified patent and that said Letters Patent are hereby corrected as shown below:

On the Title page, after "Assignee:" -- of one-half
    interest -- should be inserted.

Signed and sealed this 6th day of May 1975.

(SEAL)
Attest:

RUTH C. MASON
Attesting Officer

C. MARSHALL DANN
Commissioner of Patents
and Trademarks